(12) United States Patent
Maeda et al.

(10) Patent No.: US 6,408,095 B1
(45) Date of Patent: *Jun. 18, 2002

(54) SYSTEM, APPARATUS AND METHOD FOR COMMUNICATION, DISPLAY AND OUTPUT OF IMAGES

(75) Inventors: Masamine Maeda, Chiba; Hideyuki Arai, Kawasaki, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/911,749

(22) Filed: Aug. 15, 1997

(30) Foreign Application Priority Data

Aug. 27, 1996 (JP) ............................... 8-224915
Aug. 27, 1996 (JP) ............................... 8-224916

(51) Int. Cl.$^7$ ................................. G06K 9/36
(52) U.S. Cl. ....................... 382/232; 382/239
(58) Field of Search ............................. 382/232, 239, 382/234; 358/425, 426, 1.13

(56) References Cited

U.S. PATENT DOCUMENTS

| | | | |
|---|---|---|---|
| 4,531,189 A | * | 7/1985 | Mosier et al. .............. 364/550 |
| 5,440,491 A | * | 8/1995 | Kawano et al. ............. 364/443 |
| 5,757,766 A | * | 5/1998 | Sugita ........................ 370/206 |
| 5,781,542 A | * | 7/1998 | Tanaka et al. .............. 370/342 |
| 5,835,488 A | * | 11/1998 | Sugita ........................ 370/335 |
| 5,883,613 A | * | 3/1999 | Iwaki .......................... 345/132 |
| 5,956,426 A | * | 9/1999 | Matsuura et al. ........... 382/239 |

* cited by examiner

Primary Examiner—Yon J. Couso
(74) Attorney, Agent, or Firm—Fitzpatrick, Cella, Harper & Scinto (57) ABSTRACT

A reception apparatus includes a display unit for displaying image information and a first communication unit for transmitting information on a display performance of the display unit. A transmission apparatus includes a compressing unit for compression-coding image information, a second communication unit for modulating and transmitting image information output from the compressing unit, a controlling unit for controlling at least one of the compression-coding by the compressing unit and the modulation by the second communication unit in accordance with information on the display performance, wherein the reception apparatus displays image information transmitted from the transmission apparatus. Accordingly, a process can be realized which properly satisfies both the image quality and transmission rate of image information to be transmitted, in accordance with the display performance of the display unit.

24 Claims, 10 Drawing Sheets

SYSTEM, APPARATUS AND METHOD FOR COMMUNICATION, DISPLAY AND OUTPUT OF IMAGES

BACKGROUND OF THE INVENTION

1. Field of the Invention

The present invention relates to an image communication system, an image communication apparatus and an image communication method. More particularly, the invention relates to techniques for image information communication with image display apparatuses using radio communication techniques or the like.

2. Related Background Art

Techniques have been developed recently for transmitting image information to remote image display apparatuses by using a spectrum diffusion communication method. With such conventional techniques, image information of a predetermined image quality is transmitted at a predetermined transmission rate. If the image quality of image information has priority over other qualities, a transmission rate is generally set high in order to transmit a large amount of data.

In such a case, some inconveniences occur if the reception side has a plurality of image display apparatuses having different display performances and one of the apparatuses is to be selected.

For example, in transmitting image information to an image display apparatus having a display unit of a small size and a low resolution, image information is transmitted at an image quality and a transmission rate suitable for the resolution of the display unit. Therefore, if the image quality and transmission rate of image information to be transmitted are preset as in a conventional case, a large amount of image information is transmitted wastefully.

Furthermore, if a large amount of data is transmitted at high rate by using a spectrum diffusion communication method, a transmission distance becomes long. Therefore, in the above case, a large amount of image information is transmitted at an image quality greater than that required by an image display apparatus, and the transmission distance is made wasteful.

SUMMARY OF THE INVENTION

An object of the present invention is to solve the above-described problem.

Another object of the present invention is to provide an image communication apparatus capable of realizing a process of properly setting the image quality and transmission rate of image information to be transmitted, so as to match the display performance of a display apparatus.

According to a preferred embodiment of the present invention solving the above objects, an image communication apparatus is disclosed which comprises: (a) compressing means for compression-coding image information; (b) communication means for modulating and transmitting image information output from the compressing means; (c) input means for inputting information on a display performance of a display unit; and (d) controlling means for controlling at least one of the compression-coding by the compressing means and the modulation by the communication means in accordance with information on the display performance input from the input means.

According to another embodiment of the present invention, an image communication apparatus is disclosed which comprises: (a) information amount regulating means for regulating the information amount of image information; (b) communication means for modulating and transmitting the image information output from the information amount regulating means; (c) input means for inputting information on a display performance of a display unit; and (d) controlling means for controlling at least one of the information amount regulated by the information amount regulating means and the modulation by the communication means in accordance with information on the display performance input from the input means.

Another object of the present invention is to provide an image display apparatus capable of realizing a process of displaying image information by making the image quality and transmission rate of the image information match the display performance of the image display apparatus.

According to a preferred embodiment of the present invention solving the above object, an image display apparatus is disclosed which comprises: (a) display means for displaying image information; (b) output means for outputting information on a display performance of the display means; and (c) input means for inputting image information generated in accordance with the information on the display performance.

Another object of the present invention is to provide an image communication system capable of realizing a process of properly setting the image quality and transmission rate of image information, so as to match the display performance of a display apparatus.

According to a preferred embodiment of the present invention solving the above object, an image communication system is disclosed which comprises a reception apparatus comprising: (a) display means for displaying image information; and (b) first communication means for transmitting information on a display performance of the display means; and a transmission apparatus comprising: (a) compressing means for compression-coding image information; (b) second communication means for modulating and transmitting image information output from the compressing means; (c) controlling means for controlling at least one of the compression-coding by the compressing means and the modulation by the second communication means in accordance with information on the display performance, wherein the display means of the reception apparatus displays image information transmitted from the transmission apparatus.

According to another embodiment of the present invention, an image communication system is disclosed which comprises a reception apparatus comprising: (a) display means for displaying image information; and (b) first communication means for transmitting information on a display performance of the display means; and a transmission apparatus comprising: (a) information amount regulating means for regulating the information amount of image information; (b) second communication means for modulating and transmitting image information output from the image amount regulating means; (c) controlling means for controlling at least one of the information amount to be regulated by the information amount regulating means and the modulation by the second communication means in accordance with information on the display performance, wherein the display means of the reception apparatus displays image information transmitted from the transmission apparatus.

Another object of the present invention is to provide an image communication method capable of realizing a process of setting the image quality and transmission rate of image information, so as to match the display performance of a display apparatus.

According to a preferred embodiment of the present invention solving the above object, an image communication apparatus is disclosed which comprises: (a) a compression step of compressing image information through compression-coding; (b) a communication step of modulating and transmitting image information obtained at the compression step; (c) an input step of inputting information on a display performance of a display unit; and (d) a control step of controlling at least one of the compression-coding by the compression step and the modulation by the communication step in accordance with information on the display performance obtained at the input step.

According to another embodiment of the present invention, an image communication method is disclosed which comprises: (a) an information amount regulating step of regulating the information amount of image information; (b) a communication step of modulating and transmitting image information obtained at the regulating step; (c) an input step of inputting information on a display performance of a display unit; and (d) a control step of controlling at least one of the information amount to be regulated at the regulating step and the modulation by the communication step in accordance with information on the display performance input at the input step.

An object of the present invention is to provide an image output apparatus capable of realizing a process of setting the image quality and transmission rate of image information, so as to match the display performance of a display apparatus.

According to a preferred embodiment of the present invention solving the above object, an image output apparatus is disclosed which comprises: (a) information amount regulating means for regulating the information amount of image information; (b) output means for modulating and outputting the image information output from the information amount regulating means to a display unit; and (c) controlling means for controlling at least one of the information amount to be regulated by the information amount regulating means and the modulation by the output means in accordance with information on a display performance of the display unit.

According to another embodiment of the present invention, an image output apparatus is disclosed which comprises: (a) an information amount regulating step of regulating the information amount of image information; (b) an output step of modulating and outputting the image information obtained at the information amount regulating step to an output unit; and (c) a control step of controlling at least one of the information amount to be regulated at the regulating step and the modulation by the output step in accordance with information on the display performance of the display unit.

Still other objects of the present invention, and the advantages thereof, will become fully apparent from the following detailed description of the embodiments.

DETAILED DESCRIPTION OF THE PREFERRED EMBODIMENTS

The preferred embodiments of the present invention will be described in detail hereinafter with reference to the accompanying drawings.

(First Embodiment)

Figure 1:
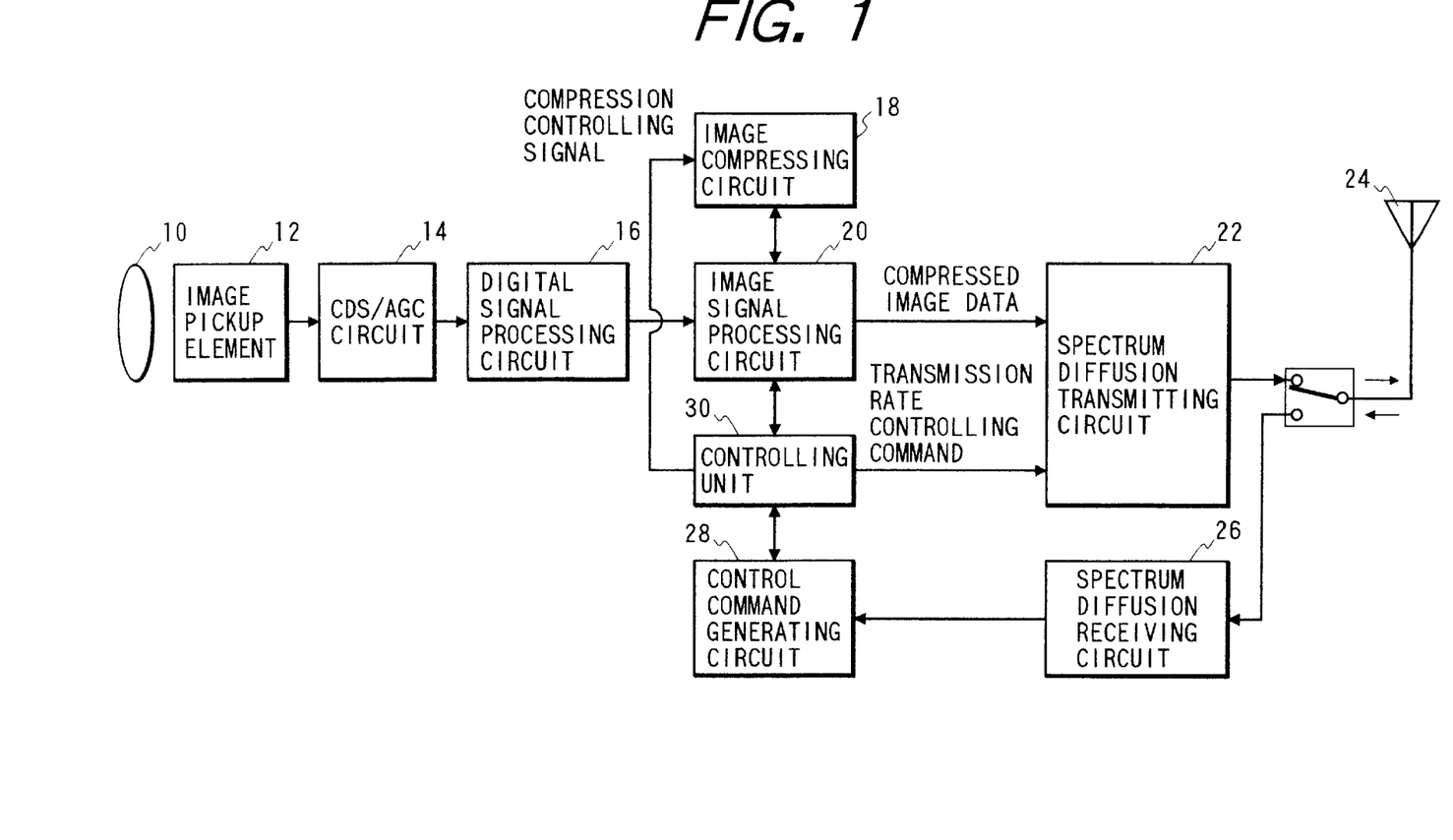
FIG. 1 is a block diagram showing the structure of an image transmitting apparatus according to a first embodiment of the invention.

FIG. 1 shows a schematic block diagram showing the outline of an image transmitting apparatus according to the first embodiment of the invention. Reference numeral 10 represents a lens for focussing an optical image of a subject onto a photoelectrical converting surface of an image pickup element 12. Reference numeral 14 represents a CDS/AGC circuit which samples and holds an analog image signal output from the image pickup element 12 to make it have an adequate signal level. Reference numeral 16 represents a digital signal processing circuit for generating a standard television signal such as NTSC and PAL by converting an analog output of the CDS/AGC circuit 14 and digitally processing the digital output such as gamma correction and color balance adjustment. Reference numeral 18 represents an image compressing circuit for compressing transmission image data in a predetermined frame unit, e.g., intra-frame encoding such as JPEG compression. Reference numeral 20 represents an image signal processing circuit for controlling the image compressing circuit 18 to convert compressed image data supplied from the image compressing circuit 18 into a data format suitable for spectrum diffusion transmission and to supply the data having the converted format to a next stage spectrum diffusion transmitting circuit 22 in accordance with a predetermined communication protocol. The spectrum diffusion transmitting circuit 22 spectrum-diffusion modulates the compressed data of the predetermined frame unit output from the image signal processing circuit 20, and supplies the modulated data to an antenna 24.

Reference numeral 26 represents a spectrum diffusion receiving circuit for receiving and demodulating spectrum-diffusion modulated data transmitted from an image display apparatus, the data including information on a display performance of the image display apparatus and other information. Reference numeral 28 represents a control command generating circuit for generating a control command from the information on the display performance (in this embodiment, information on the image quality and transmission rate requested by the image display apparatus) output from the spectrum diffusion receiving circuit 26. Reference numeral 30 represents a controlling unit (including a microcomputer) for controlling an image compression factor of the image compressing circuit 18 via the image signal processing circuit 20 in accordance with a control command output from the control command generating circuit 28 and for controlling the transmission rate of data to be transmitted from the spectrum diffusion transmitting circuit 22.

Figure 2:
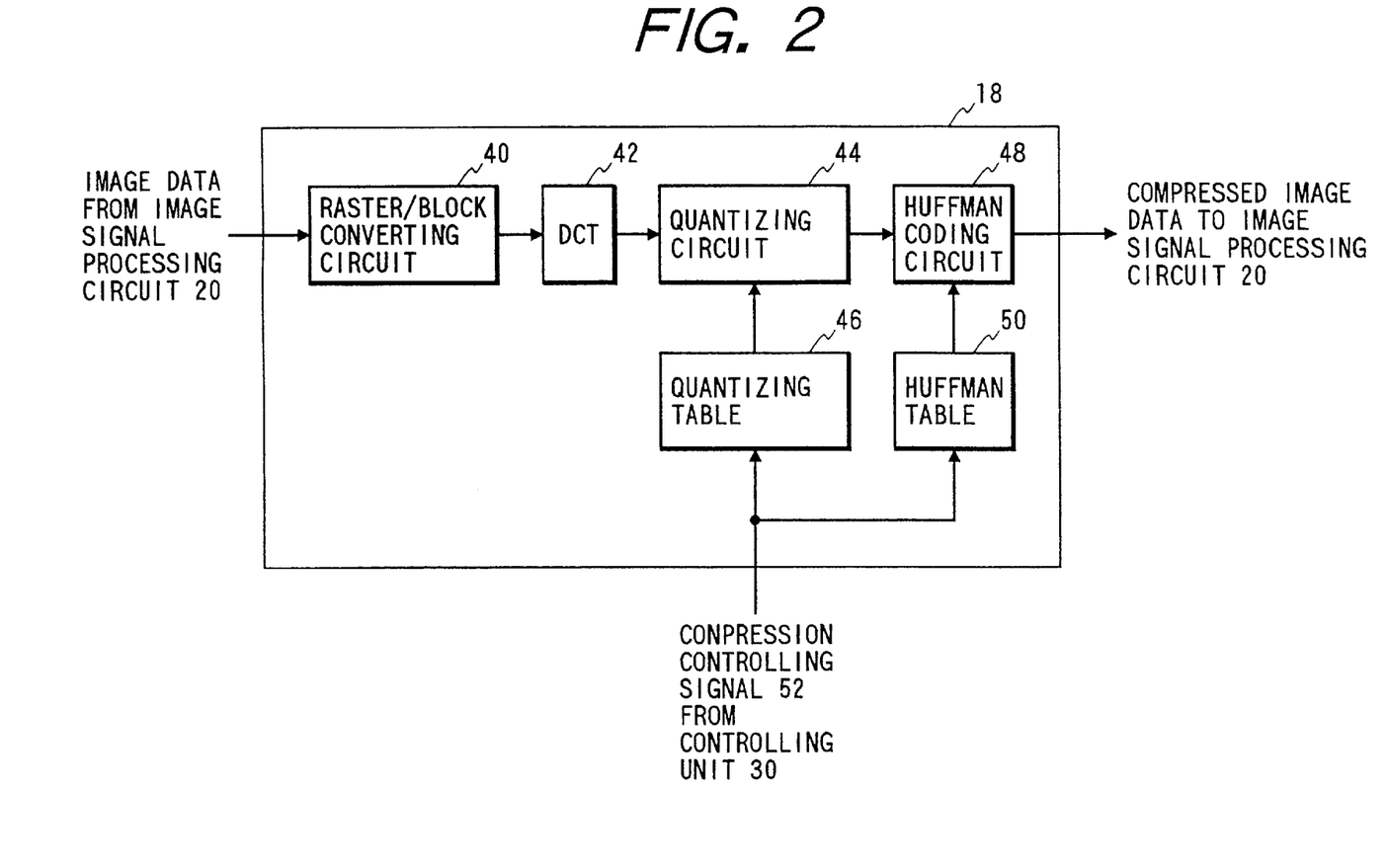
FIG. 2 is a block diagram showing the detailed structure of an image compressing circuit 18 shown in FIG. 1.

FIG. 2 is a block diagram showing the details of the image compressing circuit 18. A raster/block converting circuit 40 converts image data to be compressed into block data of 8×8 pixels. A discrete cosine transforming (DCT) circuit 42 discrete-cosine transforms an output of the raster/block converting circuit 40 in the unit of 8×8 pixel block data. A quantizing circuit 44 quantizes an output (conversion coefficient data) from the DCT circuit 42 by referring to a plurality of quantizing tables supplied from a quantizing table storage circuit (e.g., look-up tables) 46. A Huffman coding circuit 48 Huffman-codes the data output from the quantizing circuit 44 by referring to a plurality of Huffman tables supplied from a Huffman table storage circuit 50. An output of the Huffman coding circuit 48 is supplied to the image compressing circuit 18.

The quantizing tables supplied from the quantizing table storage circuit 46 to the quantizing circuit 44 and the Huffman tables supplied from the Huffman table storage circuit 50 to the Huffman quantizing circuit 48 are selectively used in accordance with a compression controlling signal 52 supplied from the controlling unit 30. Namely, in accordance with this compression controlling signal 52, these tables can be selected so that the compression factor of image data supplied to the image compressing circuit 18 is set in a predetermined range.

Figure 3:
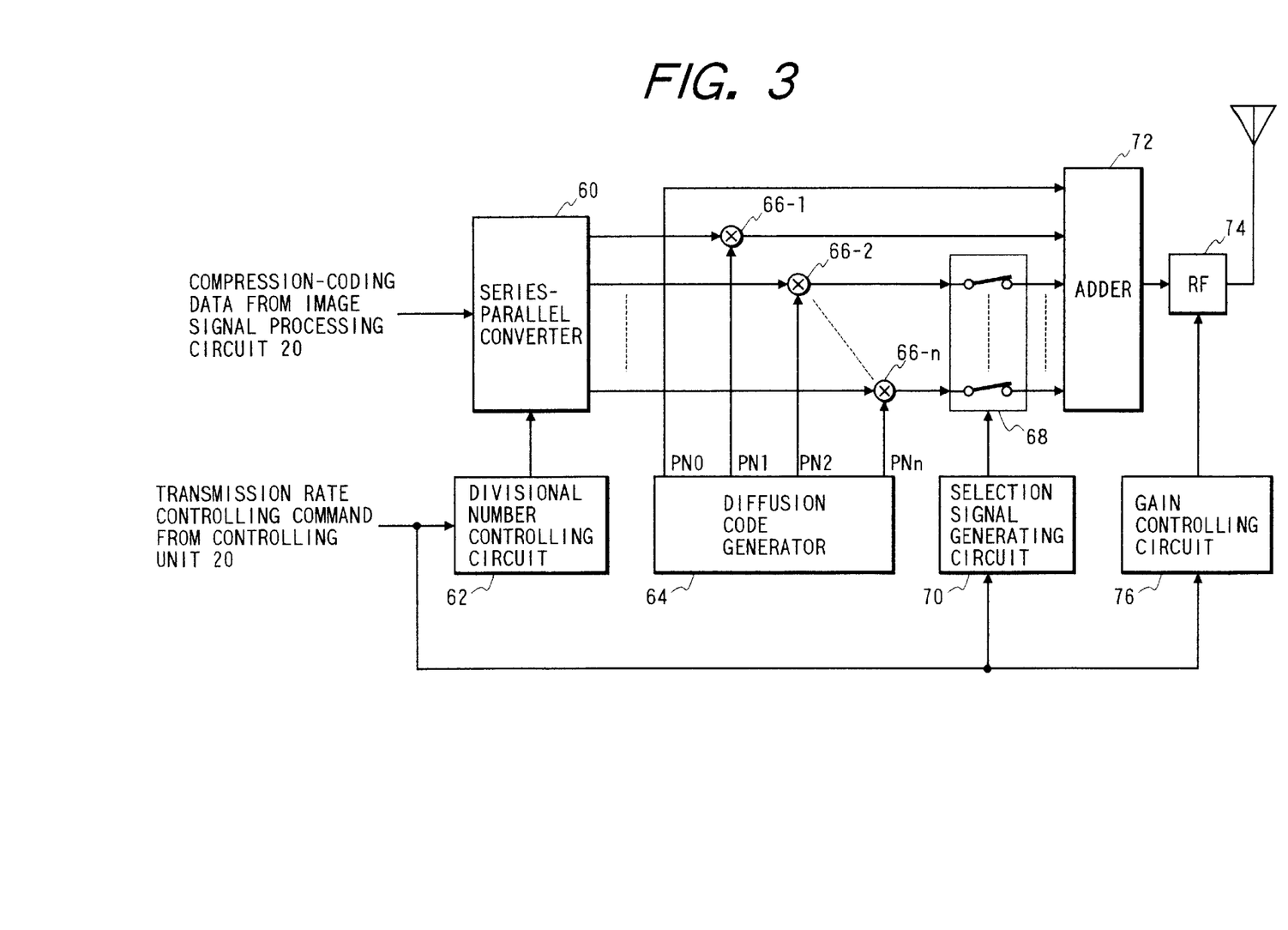
FIG. 3 is a block diagram showing the detailed structure of a spectrum diffusion transmitting circuit 22 shown in FIG. 1.

FIG. 3 is a schematic block diagram showing the outline of the spectrum diffusion transmitting circuit 22. Reference numeral 60 represents a serial-parallel converter for converting compression image data in the predetermined frame unit supplied from the image signal processing circuit 20 into n parallel data. Reference numeral 62 represents a divisional number controlling circuit for controlling a divisional number to be used by the serial-parallel converter 60 in accordance with a transmission rate controlling command from the controlling unit 30. Reference numeral 64 represents a diffusion code generator for generating different diffusion code series (m series) for the respective parallel data (n data sets) output from the serial-parallel converter 60. Reference numeral 66-1 to 66-n represent multipliers for multiplying the parallel data sets output from the serial-parallel converter 60 by diffusion code series PN1 to PNn (n series) generated by the diffusion code generator 64. Reference numeral 68 represents switches for turning on and off the outputs of the multipliers 66-2 to 66-n. Reference numeral 70 represents a selection signal generating circuit for generating a selection signal for selecting the switch 68 in accordance with the transmission rate controlling command. Reference numeral 72 represents an adder for performing signal multiplexing through addition of one diffusion code from the diffusion code generator 64, an output from the multiplier 66-1, and the output from the multipliers 66-2 to 66-n selected by the switch 68. Reference numeral 74 represents an RF circuit for converting an output from the adder 72 into a radio frequency signal. Reference numeral 76 represents a gain controlling circuit for controlling the gain of the RF circuit in accordance with the transmission rate controlling command (specifically, the divisional number).

In the first embodiment constructed as above, the divisional number controlling circuit 62 and selection signal generating circuit 70 control the modulation process by changing the divisional number in accordance with the transmission rate controlling command supplied from the controlling unit 30. The transmission rate of the compressed image data to be transmitted can therefore be changed to be a predetermined transmission rate.

Figure 4:
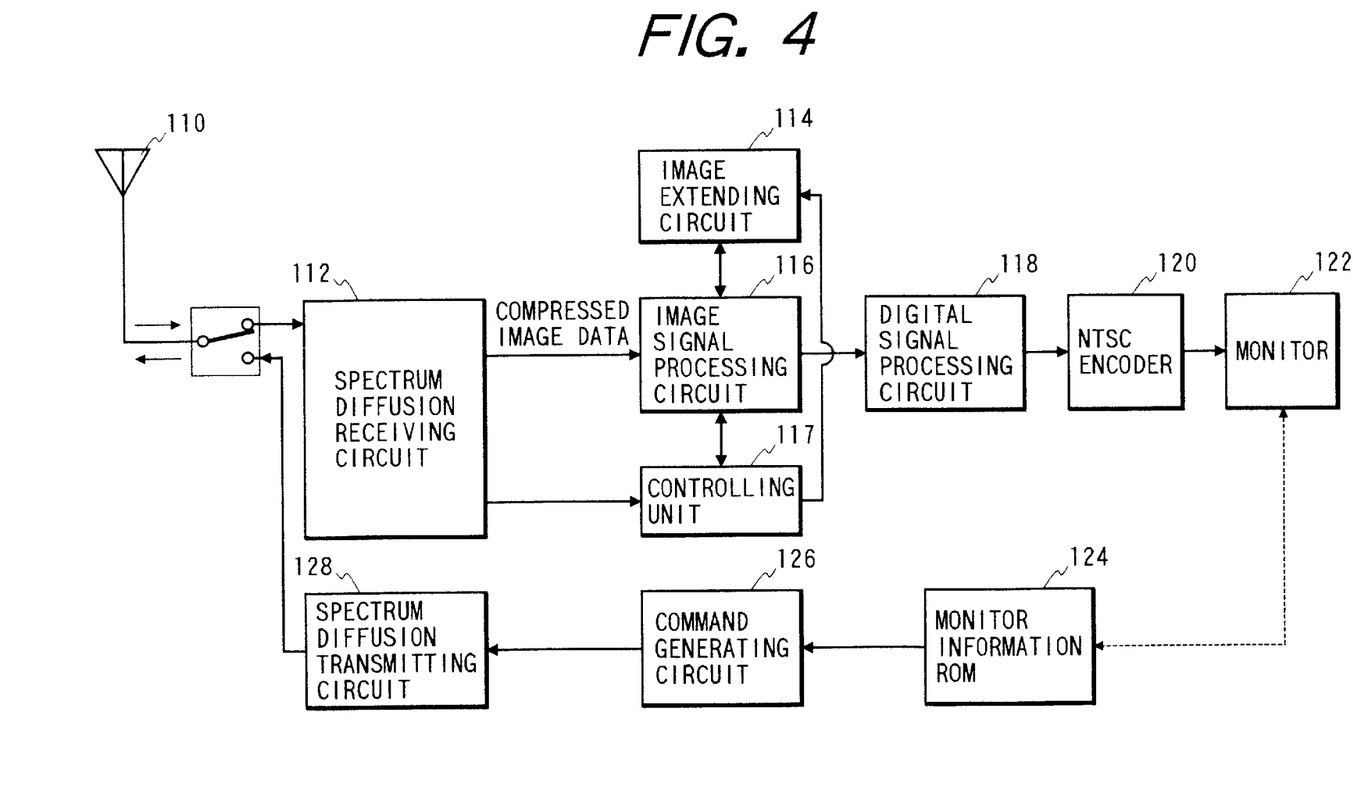
FIG. 4 is a block diagram showing the structure of an image display apparatus according to the first embodiment of the invention.

FIG. 4 is a schematic block diagram showing the outline of an image display apparatus according to the first embodiment of the invention. In FIG. 4, reference numeral 110 represents a transmission/reception antenna, and reference numeral 112 represents a spectrum diffusion receiving circuit for demodulating (inverse diffusion demodulation) the signal received by the transmission/reception antenna 110 to reproduce the compressed image data. Reference numeral 114 represents an image extending circuit for recovering original image data of the compressed image data by executing an extension process corresponding to the compression process made by the image compressing circuit 18. Reference numeral 116 represents an image data processing circuit for recovering the original image data of the compressed image data supplied from the spectrum diffusion receiving circuit 112 in cooperation with the image extending circuit 114 having a memory. Reference numeral 117 represents a controlling unit (including a microcomputer) for controlling the image signal processing circuit 116 in accordance with a transmission rate of the received signal detected with the spectrum diffusion receiving circuit 112, and for controlling the respective processing circuits of the image display apparatus.

Reference numeral 118 represents a digital signal processing circuit for converting the image data from the image signal processing circuit 116 into analog signals. Reference numeral 120 represents an NTSC encoder for converting an output signal from the digital signal processing circuit 118 into NTSC video signals. Reference numeral 122 represents a monitor for displaying images in accordance with the output signal from the NTSC encoder 120.

Reference numeral 124 represents a monitor information ROM for storing information (hereinafter called monitor information) on the display performances of the monitor 122 such as the type; size, available frame rates, color/monochrome, and resolution. Reference numeral 126 represents a command generating circuit for reading the display performance information stored in the monitor information ROM 124 and converting it into command data having a predetermined format. Reference numeral 128 represents a spectrum diffusion transmitting circuit for spectrum-diffusion modulating the command data generated by the command generating circuit 126 and transmitting it via the antenna 110 to the image transmitting apparatus.

Figure 5:
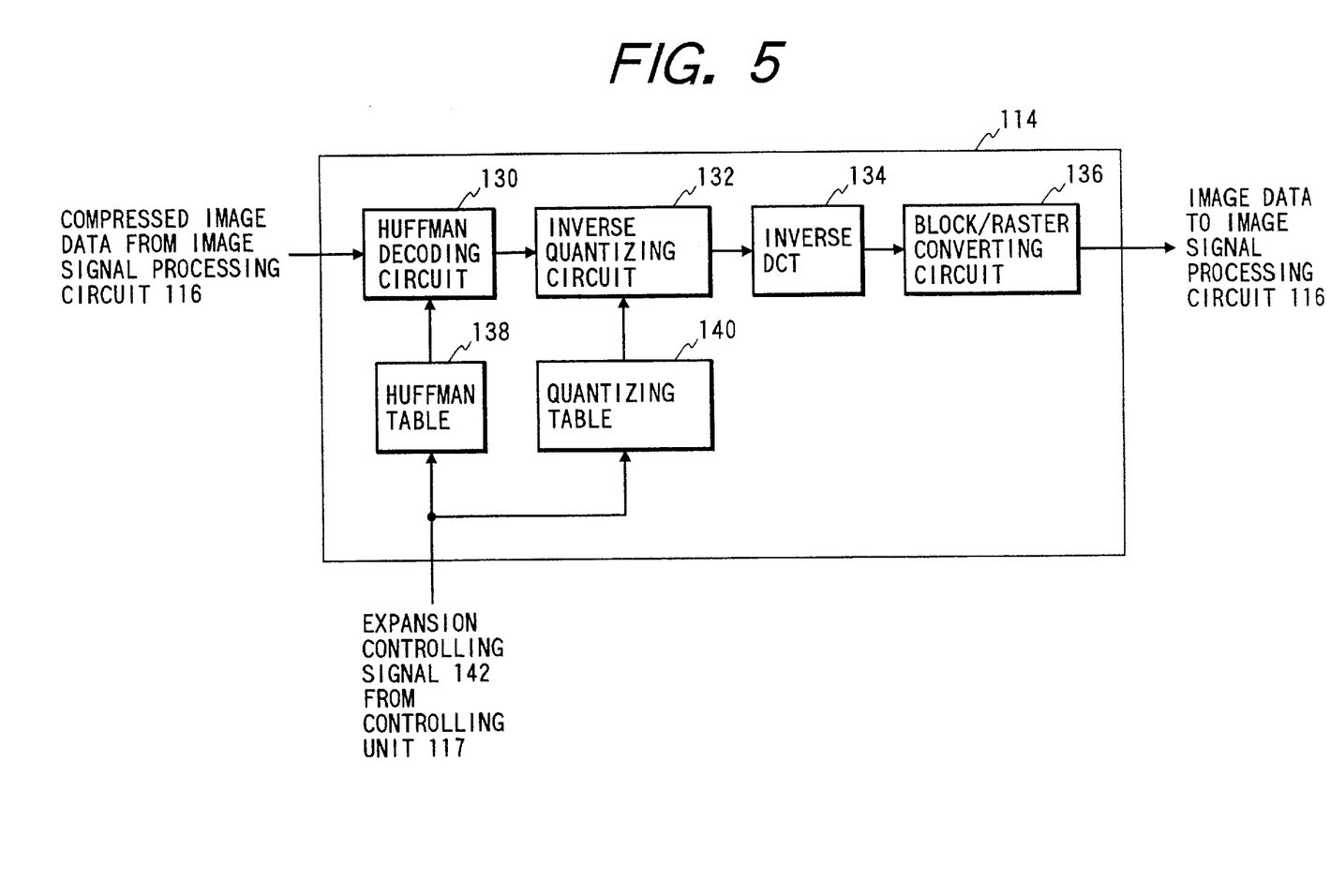
FIG. 5 is a block diagram showing the detailed structure of an image extending circuit 114 shown in FIG. 4.

FIG. 5 is a schematic block diagram showing the outline of the image extending circuit 114. Reference numeral 130 represents a Huffman decoding circuit for Huffman decoding the compressed image data supplied from the image signal processing circuit 116 by using a Huffman table whose contents correspond to the Huffman coding process to be executed by the image compressing circuit 18. Reference numeral 132 represents an inverse quantizing circuit for inverse-quantizing an output of the Huffman encoding circuit 130 by using a quantizing table whose contents correspond to the quantizing process to be executed by the image compressing circuit 18. Reference numeral 134 represents an inverse DCT circuit for inverse diffusion cosine transforming output data from the inverse quantizing circuit 132. Reference numeral 136 represents a block/raster converting circuit for converting the output data of the inverse DCT circuit 134 from the block order into the raster order. An output of the block/raster converting circuit 136 is an output of the image extending circuit 114, i.e., recovered image data of the image information prior to the compressing process. A Huffman table generating circuit 138 and a quantizing table generating circuit 140 generate a Huffman table and a quantizing table whose contents correspond to the compression process to be executed by the image compressing circuit 18, in accordance with an expanding control signal 142 supplied from the controlling unit 117.

The compressed image data subjected to the DCT transformation, quantizing and Huffman coding at the image transmitting apparatus on the transmission side is recovered into the original image data after being subjected to Huffman decoding, inverse quantizing and inverse DCT transformation at the apparatus constructed as shown in FIG. 5.

Figure 6:
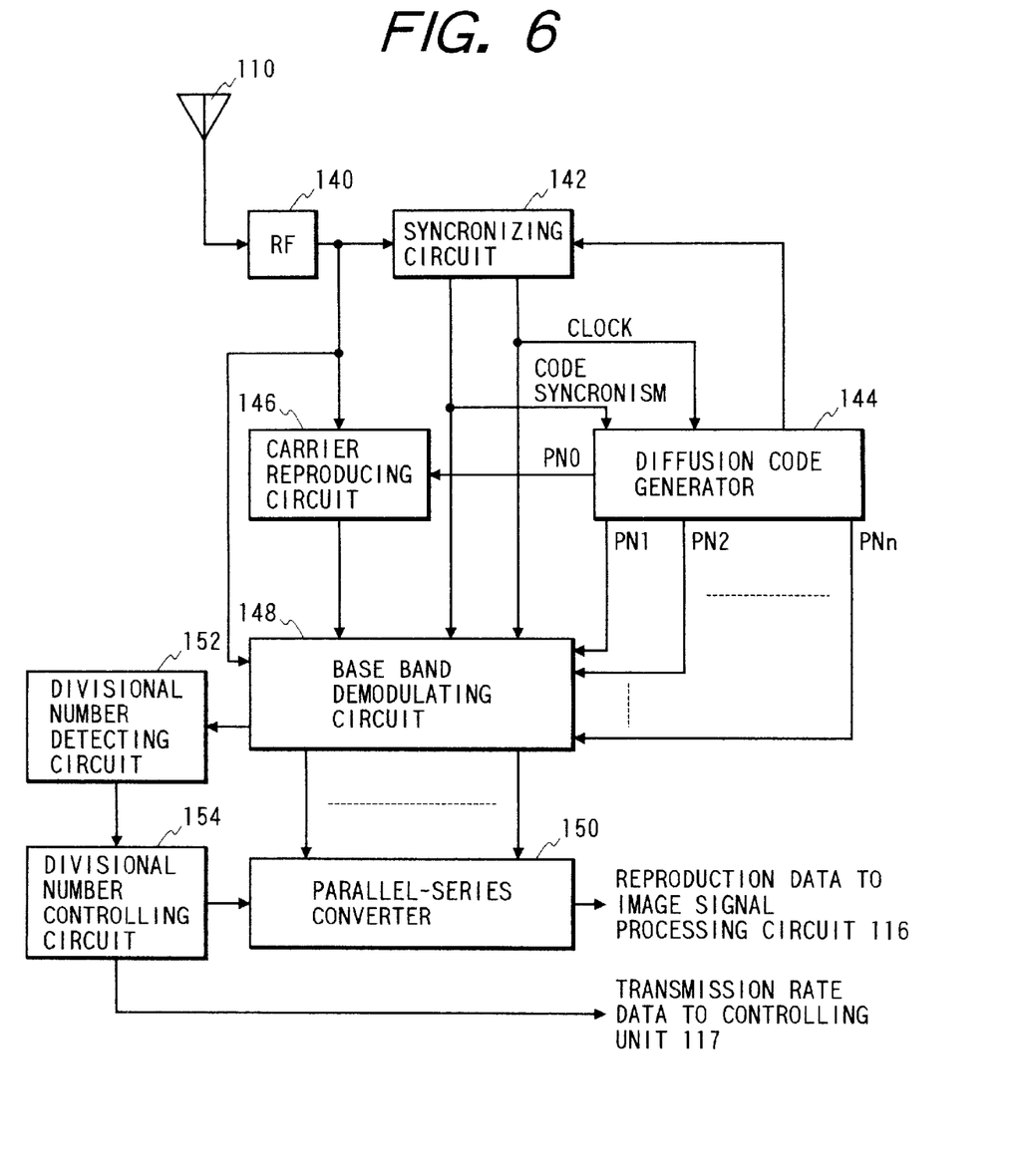
FIG. 6 is a block diagram showing the detailed structure of a spectrum diffusion receiving circuit 112 shown in FIG. 4.

FIG. 6 is a schematic block diagram showing the outline of the spectrum diffusion receiving circuit 112. Reference numeral 140 represents an RF circuit for converting a signal received at a transmission/reception antenna 110 into a signal having a predetermined internal frequency. Reference numeral 142 represents a synchronizing circuit for capturing and maintaining synchronism of the received diffusion signal. Reference numeral 144 represents a diffusion code generator for generating a diffusion code same as the diffusion code obtained through diffusion demodulation of the received signal, in accordance with the code synchronism signal and clock signal supplied from the synchronizing circuit 142. Reference numeral 146 represents a carrier reproducing circuit for reproducing a carrier signal in accordance with a carrier reproducing diffusion code PN0 output from the diffusion code generator 144 and an output signal from the RF circuit 140. Reference numeral 148 represents a base band demodulating circuit for demodulating (inverse diffusion demodulating) an output of the RF circuit 140 into a base band signal, in accordance with the carrier signal from the carrier reproducing circuit 146 and n diffusion code series from the diffusion code generator 144. Reference numeral 150 represents a parallel-serial converter for converting a plurality of demodulated data sets output from the base band demodulating circuit 148 into serial data. Reference numeral 152 represents a divisional number detecting circuit for detecting the divisional number set by the spectrum diffusion transmitting circuit 22, in accordance with the inverse diffusion modulation process executed by the base band demodulating circuit 148. Reference numeral 154 represents a divisional number controlling circuit for controlling the divisional number to be used for serial conversion at the parallel-to-serial converter 150, in accordance with the divisional number detected by the divisional number detecting circuit 152, and for outputting data representative of the transmission rate contained in the received signal.

The circuit constructed as shown in FIG. 6 demodulates the spectrum diffusion demodulated, received signal. The structure and operation of this circuit are well known.

Figure 7:
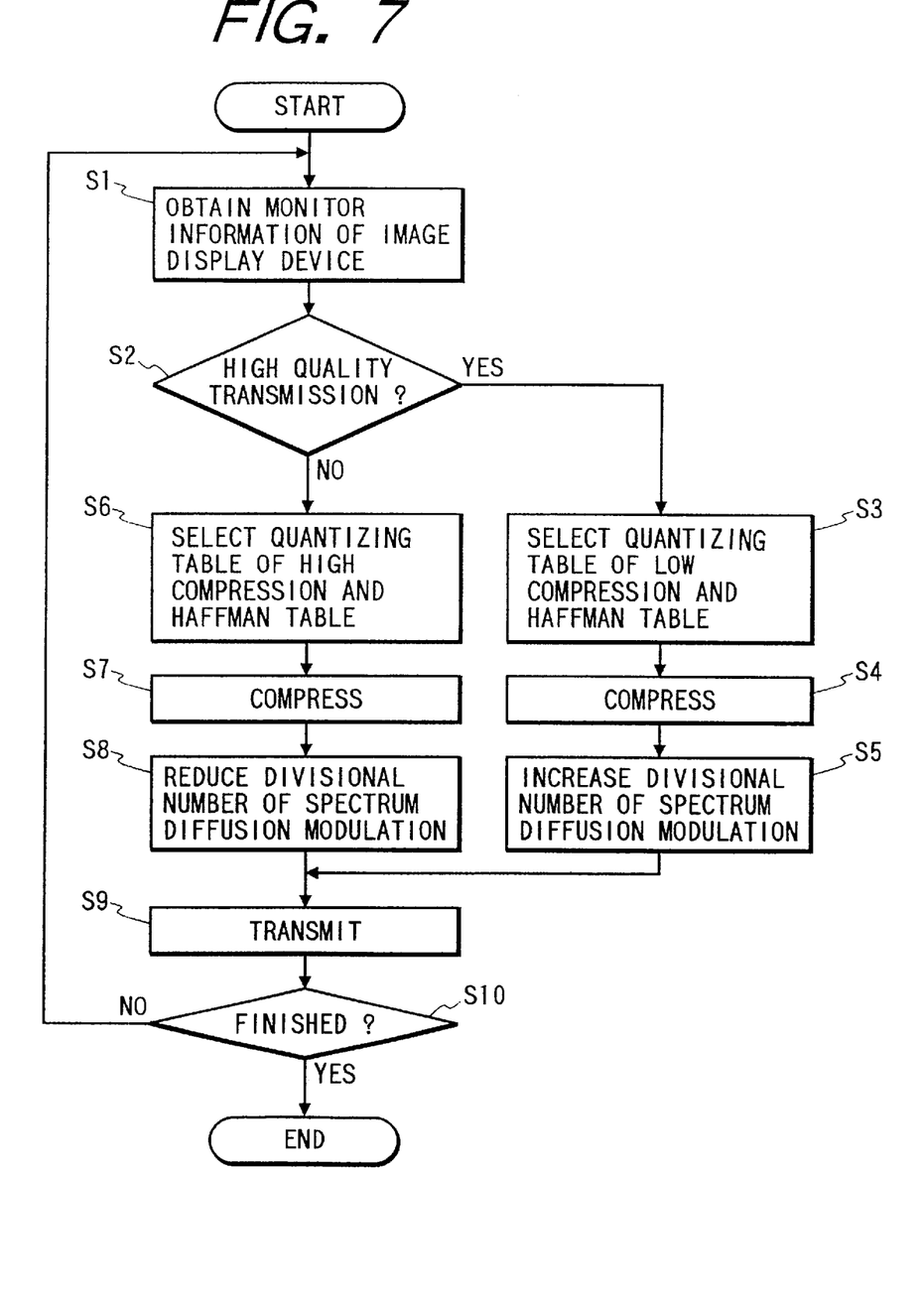
FIG. 7 is a flow chart illustrating a compression coding process of the image transmitting apparatus of the first embodiment.

FIG. 7 is a flow chart illustrating the operation of the image transmitting apparatus to be executed in response to the display performance information on the monitor 122 of the image display apparatus. The monitor information on the monitor 122 stored in the monitor information ROM 124 includes, for example, the type (CRT, liquid crystal display, etc.), size, horizontal and vertical resolutions, frame rate (the number of frames which can be displayed in a unit period), color/monochrome, and the number of pixels.

The image transmitting apparatus acquires monitor information from the image display apparatus (S1), and in accordance with the contents of the monitor information, judges whether high image quality transmission is performed (S2). For example, if the monitor 122 of the image display apparatus is a CRT monitor of a 29-inch type and has a horizontal resolution of 700 lines, the high image quality transmission is selected. Specifically, the controlling unit 30 selects from the table storage circuits 46 and 50 a quantizing table and a Huffman table respectively of a low compression factor to be used by the quantizing circuit 44 and Huffman coding circuit 48 of the image compressing circuit 18 (S3), to thereby compress the image data at a low compression factor (S4). The controlling unit 30 controls the modulating process to set the transmission rate to a high speed, by increasing the divisional number of the compressed data to be supplied to the spectrum diffusion transmitting circuit 22.

If the monitor 122 of the image display apparatus is a liquid crystal display monitor of a 4-inch type and has the number of pixels of about seventy thousands, the controlling unit 30 selects a low image quality transmission. In this case, the controlling unit 30 selects from the table storage circuits 46 and 50 a quantizing table and a Huffman table respectively of a high compression factor to be used by the quantizing circuit 44 and Huffman coding circuit 48 of the image compressing circuit 18 (S6). The image compressing circuit 18 compresses the image data at a high compression factor (S7). The controlling unit 30 controls the modulating process to set the transmission rate to a low speed, by reducing the divisional number of the compressed data to be supplied to the spectrum diffusion transmitting circuit 22 (S8).

In the above manner, the image information compressed in accordance with the monitor information supplied from the image display apparatus is transmitted to the image display apparatus at a transmission rate (divisional number) selected in accordance with the monitor information (S9). If the image information is transmitted completely, the image transmitting apparatus terminates the above processes, whereas if not, the above processes are repeated (S10).

As described above, according to the first embodiment of the present invention, in accordance with the display performance of a monitor of the image display apparatus, at least one of the compressing and modulating processes of image data to be transmitted is controlled. Accordingly, the image quality and transmission rate of image information to be transmitted to the image display apparatus can be set satisfactorily.

<Second Embodiment>

An image communication system and an image communication apparatus according to the second embodiment of the invention will be described in the following. In this second embodiment, the structures similar to the first embodiment are given identical reference numerals and the detailed description thereof is omitted.

In the second embodiment, the image transmitting apparatus controls at least one of thinning and modulating processes of image information to be transmitted, in accordance with the monitor display performance information supplied from an image display apparatus.

Figure 8:
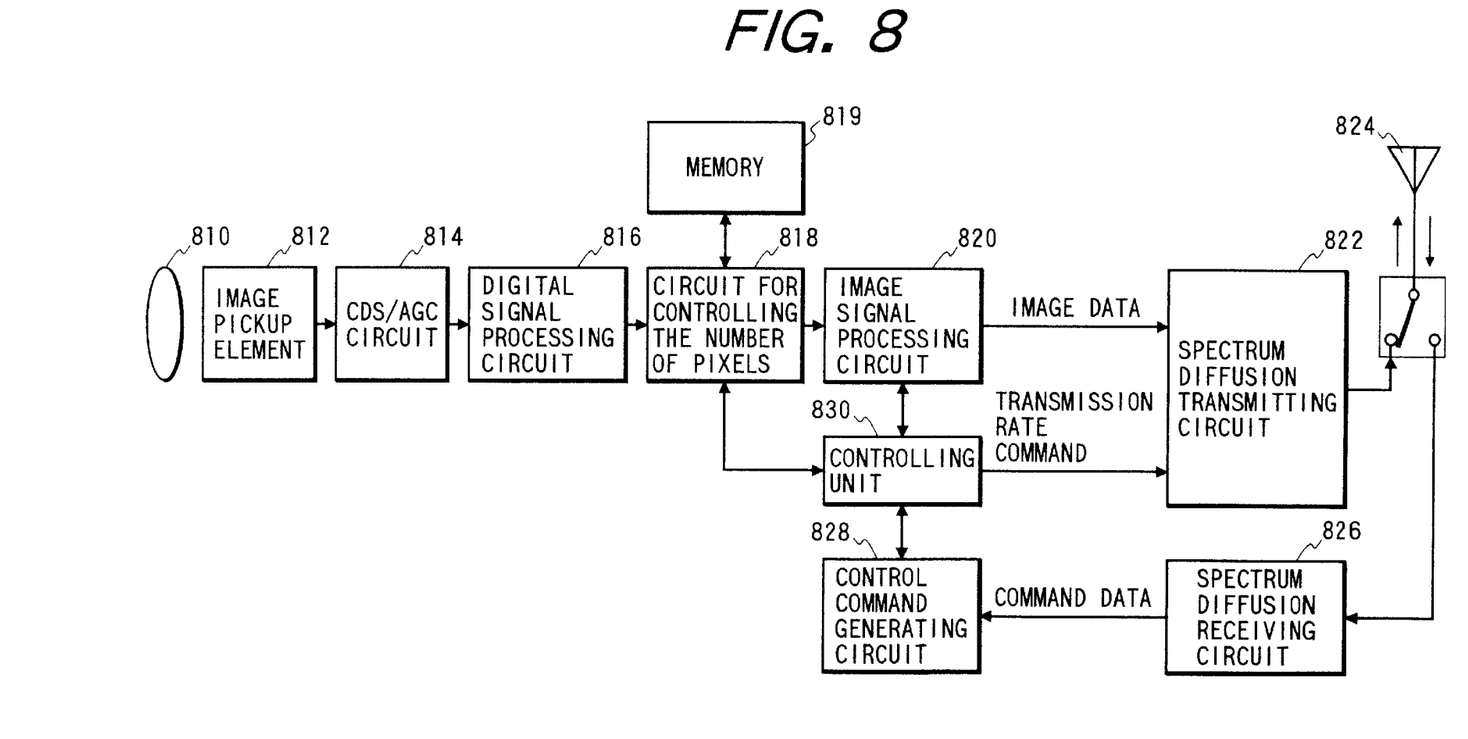
FIG. 8 is a block diagram showing the structure of an image transmitting apparatus according to a second embodiment of the invention.

FIG. 8 shows a schematic block diagram showing the outline of an image transmitting apparatus according to the second embodiment of the invention. Reference numeral 810 represents a lens for focussing an optical image of a subject onto a photoelectrical converting surface of an image pickup element 812. Reference numeral 814 represents a CDS/AGC circuit which samples and holds an analog image signal output from the image pickup element 812 to make it have an adequate signal level. Reference numeral 816 represents a digital signal processing circuit for generating a standard television signal such as NTSC and PAL by converting an analog output of the CDS/AGC circuit 814 and digitally processing the digital output such as gamma correction and color balance adjustment. Reference numeral 818 represents a pixel number controlling circuit for thinning digital image data output from the digital signal processing circuit 816 to the number of pixels indicated by a control signal supplied from a controlling unit 830, by using a memory 819 as its working area. Reference numeral 820 represents an image signal processing circuit for controlling a predetermined communication protocol used with an image display apparatus and converting the digital image data whose pixel number was adjusted by the pixel number controlling circuit 818 into a data format suitable for spectrum diffusion transmission. Reference numeral 820 represents a spectrum diffusion transmitting circuit for spectrum-diffusion modulating the thinned data output from the image signal processing circuit 820, and supplies the modulated data to an antenna 824.

Reference numeral 826 represents a spectrum diffusion receiving circuit for receiving and demodulating spectrum-diffusion modulated data transmitted from an image display apparatus, the data including information on a display performance of the image display apparatus and other information. Reference numeral 828 represents a control command generating circuit for generating a control command from the information on the display performance (in this embodiment, information on the image quality and transmission rate requested by the image display apparatus) output from the spectrum diffusion receiving circuit 826. Reference numeral 830 represents a controlling unit (including a microcomputer) for controlling the pixel number controlling circuit 818 to thin pixels of the image information in accordance with a control command output from the control command generating circuit 828 and for controlling the transmission rate of data to be transmitted from the spectrum diffusion transmitting circuit 822.

The spectrum diffusion transmitting circuit 822 of the second embodiment has the same structure as the spectrum diffusion transmitting circuit 822 of the first embodiment. Namely, in accordance with a control command supplied from the controlling unit 830, the spectrum diffusion transmitting circuit 822 controls the modulation process so that the transmission rate of image data to be transmitted to the image display apparatus is set to a predetermined transmission rate (specifically, the divisional number of image data is set to a value indicated by the control command for multiplexing control).

Figure 9:
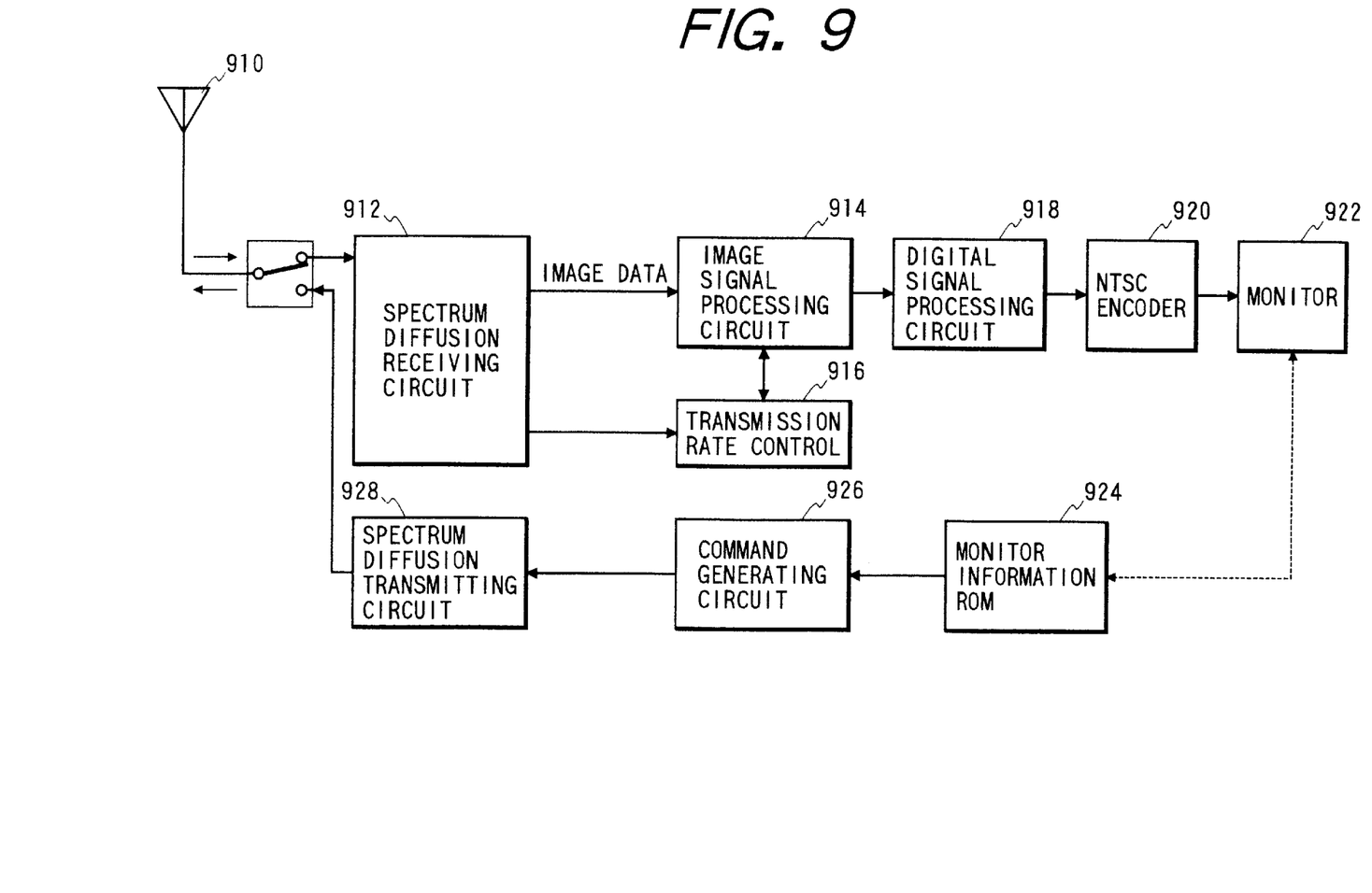
FIG. 9 is a block diagram showing the structure of an image display apparatus according to the second embodiment of the invention.

FIG. 9 is a schematic block diagram showing the outline of an image display apparatus according to the second embodiment of the invention. In FIG. 9, reference numeral 910 represents a transmission/reception antenna, and reference numeral 912 represents a spectrum diffusion receiving circuit for demodulating (inverse diffusion demodulation) the signal received by the transmission/reception antenna 910 to reproduce the compressed image data. Reference numeral 914 represents an image signal processing circuit having a memory for controlling the communication protocol with the image transmitting apparatus and outputting image data from the spectrum diffusion receiving circuit 912 in a predetermined data output format. Reference numeral 916 represents a transmission rate controlling unit (including a microcomputer) for controlling the image signal processing circuit 914 in accordance with a transmission rate of the received signal detected with the spectrum diffusion receiving circuit 912, and for controlling the respective processing circuits of the image display apparatus.

Reference numeral 918 represents a digital signal processing circuit for converting the image data from the image signal processing circuit 914 into analog signals. Reference numeral 920 represents an NTSC encoder for converting an output signal from the digital signal processing circuit 918 into NTSC video signals. Reference numeral 922 represents a monitor for displaying images in accordance with the output signal from the NTSC encoder 920.

Reference numeral 924 represents a monitor information ROM for storing information (hereinafter called monitor information) on the display performances of the monitor 922 such as the type, size, available frame rates, color/monochrome, and resolution. Reference numeral 926 represents a command generating circuit for reading the display performance information stored in the monitor information ROM 924 and converting it into command data having a predetermined format. Reference numeral 928 represents a spectrum diffusion transmitting circuit for spectrum-diffusion modulating the command data generated by the command generating circuit 926 and transmitting it via the antenna 910 to the image transmitting apparatus.

The spectrum diffusion receiving circuit 912 of the second embodiment has the same structure as that of the spectrum diffusion receiving circuit 112 of the first embodiment, and to the detailed description thereof is omitted.

Figure 10:
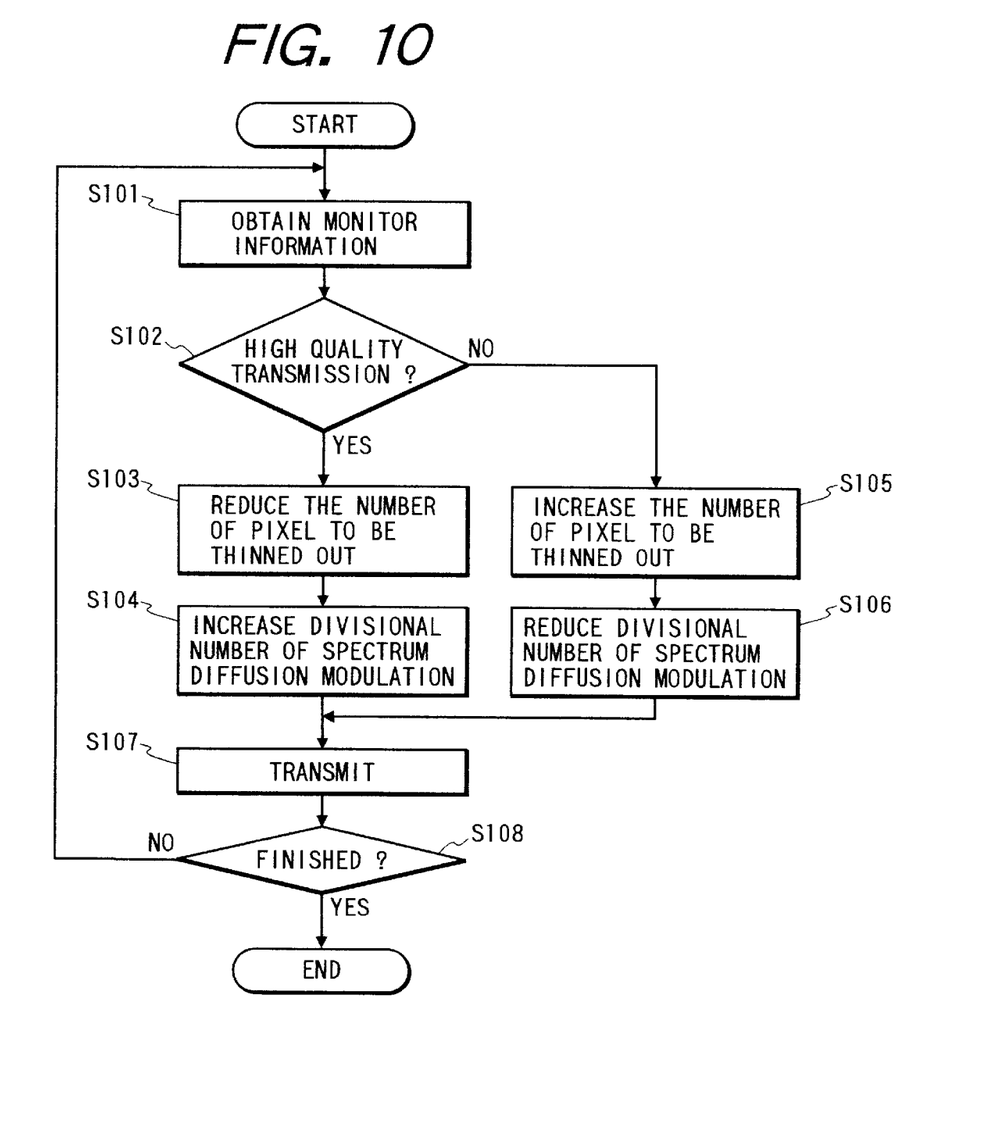
FIG. 10 is a flow chart illustrating a compression coding process of the image transmitting apparatus of the second embodiment.

FIG. 10 is a flow chart illustrating the operation of the image transmitting apparatus to be executed in response to the display performance information on the monitor 922 of the image display apparatus. The monitor information on the monitor 922 stored in the monitor information ROM 924 includes, for example, the type (CRT, liquid crystal display, etc.), size, horizontal and vertical resolutions, frame rate (the number of frames which can be displayed in a unit period), color/monochrome, and the number of pixels.

The image transmitting apparatus acquires monitor information from the image display apparatus (S101), and in accordance with the contents of the monitor information, judges whether high image quality transmission is performed (S102). For example, if the monitor 922 of the image display apparatus is a CRT monitor of a 29-inch type and has a horizontal resolution of 700 lines, the high image quality transmission is selected. Specifically, the controlling unit 830 instructs the pixel number controlling unit 818 to reduce the number of thinned pixels (S103). The controlling unit 830 controls the modulating process to set the transmission rate to a high speed, by increasing the divisional number of the image to be supplied to the spectrum diffusion transmitting circuit 822 (S104). The image data thinned in the above manner is transmitted at the selected transmission rate (divisional number).

If the monitor 922 of the image display apparatus is a liquid crystal display monitor of a 4-inch type and has the number of pixels of about seventy thousands, the controlling unit 830 selects a low image quality transmission (S102). In this case, the controlling unit 30 instructs the pixel number controlling circuit 818 to increase the number of thinned pixels (S105). The controlling unit 830 controls the modulating process to set the transmission rate to a low speed, by reducing the divisional number of the image data to be supplied to the spectrum diffusion transmitting circuit 822 (S106).

In the above manner, the image information is transmitted at the pixel number and transmission rate suitable for the display performance of the monitor 922 of the image display apparatus (S107). Accordingly, a user can perform an optimum spectrum diffusion image transmission without specifically considering the display performance. If the image information is transmitted completely, the image transmitting apparatus terminates the above processes, whereas if not, the above processes are repeated (S108).

As described above, according to the second embodiment of the present invention, in accordance with the display performance of a monitor of the image display apparatus, at least one of the thinning and modulating processes of image data to be transmitted is controlled. Accordingly, the pixel number and transmission rate of image information to be transmitted to the image display apparatus can be set satisfactorily.

Furthermore, since the information amount of original image data is controlled through pixel thinning, inexpensive image communication system and apparatus can be provided without using expensive image compressing units.

What is claimed is:

1. An image communication apparatus, comprising:
   compressing means for compressing image data;
   converting means for converting the compressed image data into a plurality of data trains;
   modulating means for modulating the plurality of data trains by using a plurality of spreading codes;
   multiplexing means for multiplexing the plurality of data trains modulated by said modulating means;
   transmitting means for transmitting the plurality of data trains multiplexed by said multiplexing means to an external display device; and
   controlling means for controlling at least one of a compressing process of said compressing means and a converting process of said converting means in accordance with display information on a performance of the external display device.

2. An image communication apparatus according to claim 1, wherein in case of controlling the compressing process, said controlling means controls an amount of the image data, and in case of controlling the converting process, said controlling means controls a number of the data trains.

3. An image communication apparatus according to claim 1, wherein the display information is transmitted by wireless from the external display device.

4. An image communication apparatus according to claim 1, wherein the display information includes at least one of a frame size, a resolution, a number of pixels, a frame rate and a type.

5. An image communication apparatus according to claim 2, wherein in case a high quality mode is selected, said controlling means controls the compressing process so as to increase an amount of the image data and controls the converting process so as to increase a number of the data trains, and in case a low quality mode is selected, said controlling means controls the compressing process so as to decrease an amount of the image data and controls the converting process so as to decrease a number of data trains.

6. An image communication apparatus according to claim 1, further comprising an image pickup unit for generating the image data.

7. An image communication apparatus, comprising:
   regulating means for regulating an amount of image data;
   converting means for converting the regulated image data into a plurality of data trains;
   modulating means for modulating the plurality of data trains using a plurality of spreading codes;
   multiplexing means for multiplexing the plurality of data trains modulated by said modulating means;
   transmitting means for transmitting the plurality of data trains multiplexed by said multiplexing means to an external display device; and
   controlling means for controlling at least one of a regulating process of said regulating means and a converting process of said converting means in accordance with display information on a performance of the external display device.

8. An image communication method, comprising the steps of:
   compressing image data;
   converting the compressed image data into a plurality of data trains;
   modulating the plurality of data trains by using a plurality of spreading codes;
   multiplexing the plurality of data trains modulated in said modulating step;
   transmitting the plurality of data trains multiplexed in said multiplexing step to an external display device; and
   controlling at least one of a compressing process of the compressing step and a converting process of the converting step in accordance with display information on a performance of the external display device.

9. An image communication method, comprising the steps of:
   regulating an amount of image data;
   converting the regulated image data into a plurality of data trains;
   modulating the plurality of data trains using a plurality of spreading codes;
   multiplexing the plurality of data trains modulated in said modulating step;
   transmitting the plurality of data trains multiplexed in said multiplexing step to an external display device; and
   controlling at least one of a regulating process of said regulating step and a converting process of said converting step in accordance with display information on a performance of the external display device.

10. A method according to claim 8, wherein in case of controlling the compressing process, said controlling step controls an amount of the image data, and in case of controlling the converting process, said controlling step controls a number of the data trains.

11. A method according to claim 8, wherein the display information is transmitted by wireless from the external display device.

12. A method according to claim 8, wherein the display information includes at least one of a frame size, a resolution, a number of pixels, a frame rate and a type.

13. A method according to claim 8, wherein in case a high quality mode is selected, said controlling step controls the compressing process so as to increase an amount of the image data and controls the converting process so as to increase a number of the data trains, and in case a low quality mode is selected, said controlling step controls the compressing process so as to decrease an amount of the image data and controls the converting process so as to decrease a number of the data trains.

14. A method according to claim 8, further comprising the step of generating the image data using an image pickup unit.

15. An apparatus according to claim 7, wherein the display information includes at least one of a frame size, a resolution, a number of pixels, a frame rate and a type.

16. An apparatus according to claim 7, wherein in case of controlling the regulating process, said controlling means controls an amount of the image data, and in case of controlling the converting process, said controlling means controls a number of the data trains.

17. A method according to claim 9, wherein the display information includes at least one of a frame size, a resolution, a number of pixels, a frame rate and a type.

18. A method according to claim 9, wherein in case of controlling the regulating process, said controlling step controls an amount of the image data, and in case of controlling the converting process, and said controlling step controls a number of the data trains.

19. An apparatus according to claim 7, wherein the display information is transmitted by wireless from the display device.

20. An apparatus according to claim 16, wherein in case a high quality mode is selected, said controlling means controls the regulating process so as to increase an amount of the image data and controls the converting process so as to increase a number of the data trains, and in case a low quality mode is selected, said controlling means controls the regulating process so as to decrease an amount of the image data and controls the converting process so as to decrease a number of the data trains.

21. An apparatus according to claim 7, further comprising an image pickup unit for generating the image data.

22. A method according to claim 9, wherein the display information is transmitted by wireless from the display device.

23. A method according to claim 18, wherein in case a high quality mode is selected, said controlling step controls the regulating process so as to increase an amount of the image data and controls the converting process so as to increase a number of the data trains, and in case a low quality mode is selected, said controlling step controls the regulating process so as to decrease an amount of the image data and controls the converting process so as to decrease a number of the data trains.

24. A method according to claim 9, further comprising a step of generating the image data using an image pickup unit.

* * * * *

UNITED STATES PATENT AND TRADEMARK OFFICE
CERTIFICATE OF CORRECTION

PATENT NO.   : 6,408,095 B1　　　　　　　　　　　　　　　　　　　　　　Page 1 of 1
DATED        : June 18, 2002
INVENTOR(S)  : Masmine Maeda et al.

It is certified that error appears in the above-identified patent and that said Letters Patent is hereby corrected as shown below:

<u>Title page,</u>
Item [56], References Cited, FOREIGN PATENT DOCUMENTS,
"61-90584　　5/1996" should read -- 61-90584　　5/1986 --.

Item [57], ABSTRACT,
Line 1, "includes" should read -- has --.

<u>Column 13,</u>
Line 4, "and" should be deleted.

Signed and Sealed this

Third Day of December, 2002

JAMES E. ROGAN
*Director of the United States Patent and Trademark Office*